US005142302A

United States Patent [19]

Kano

[11] Patent Number: 5,142,302

[45] Date of Patent: Aug. 25, 1992

[54] THERMAL TRANSFER VIDEO PRINTER HAVING IMPROVED TEMPERATURE CORRECTION FUNCTION OF COLORING DENSITY

[75] Inventor: Hiroshi Kano, Tsuzuki, Japan

[73] Assignee: Sanyo Electric Co., Ltd., Moriguchi, Japan

[21] Appl. No.: 720,329

[22] Filed: Jun. 25, 1991

[30] Foreign Application Priority Data

Jun. 25, 1990 [JP] Japan ................................ 2-167435

[51] Int. Cl.[5] ............................................ G01D 15/10
[52] U.S. Cl. ............................................ 346/76 PH
[58] Field of Search ................................... 346/76 PH

[56] References Cited

U.S. PATENT DOCUMENTS 4,691,211 9/1987 Brownstein .................... 346/76 PH
4,873,536 10/1989 Minowa et al. ................ 346/76 PH
4,893,191 1/1990 Tanaka et al. ................ 346/76 PH

FOREIGN PATENT DOCUMENTS 310971 12/1989 Japan .

*Primary Examiner*—Mark J. Reinhart
*Assistant Examiner*—Eric Frahm
*Attorney, Agent, or Firm*—Armstrong, Nikaido, Marmelstein, Kubovcik & Murray

[57] ABSTRACT

A sublimation type thermal transfer color video printer generates a heating pulse having a duration corresponding to the tone level of the pixel to be printed, according to the data in a reference tone table stored in a memory, to energize the corresponding heating element of a thermal heat during the duration. The tone table includes a variable data which is the basis of determining the duration of the first energizing pulse required up to right before the coloring of a recording paper, and a fixed data which are the bases of determining the durations of subsequent energizing pulses. A variable value multiplied by these fixed data is set in a separate register. The variable data in the tone table and the variable value in the register are rewritten according to change in temperature of the thermal head.

7 Claims, 7 Drawing Sheets

THERMAL TRANSFER VIDEO PRINTER HAVING IMPROVED TEMPERATURE CORRECTION FUNCTION OF COLORING DENSITY

BACKGROUND OF THE INVENTION

1. Field of the Invention

The present invention relates to thermal transfer video printers, and more particularly, to improvement of temperature correction system of coloring density in a thermal transfer video printer of the type controlling coloring density by controlling the heating time period of the thermal head.

2. Description of the Prior Art

A color video printer is in practical use that prints out a picture of a reproduced motion picture as a color still picture, in reproducing an image shooted by a video camera or an image recorded by a video cassette recorder (referred to as VCR hereinafter). One such color video printer is the so-called sublimation type thermal transfer color video printer which uses sublimation dye as the ink for printing. By controlling a heating time period of each of a plurality of heating elements forming the thermal head according to the tone level of the corresponding pixel, the sublimation amount of sublimation dye of each pixel into a recording paper, i.e. the coloring density, is controlled. Such a sublimation type thermal transfer color video printer is disclosed in U.S. Pat. No. 4,691,211, for example.

FIG. 1 is a block diagram schematically showing the structure of a conventional sublimation type thermal transfer color video printer. Referring to FIG. 1, a video interface circuit 11 is provided with a video signal via an input terminal 9 from a video signal source not shown (for example, the image sensed output of a video camera or the reproduced output of a VCR). Video interface circuit 11 supplies the applied video signal directly to a monitor TV unit not shown via an output terminal 10. Video interface circuit 11 also derives luminance data and color difference data forming the video signal to provide the same to an image processing unit 12.

Image processing unit 12 is formed of an image memory and the like to temporarily hold data relating to luminance and color difference of one picture provided from video interface circuit 11. These data are converted into print signals of three primary colors of cyan, magenta and yellow, and then subjected to a predetermined image process such as edge enhancement of the image. The print signals of three primary colors provided from image processing unit 12 are applied to a microcomputer 8 functioning as a system controller. The output of microcomputer 8 is applied to a thermal head control unit 1 and a mechanism driving unit 4 that will be explained later.

Thermal head 2 is constituted as a unit including a heating element 3 and periphery circuits not shown. The operation of thermal head 2 is controlled by thermal head control unit 1 according to the signal from microcomputer 8. Heating element 3 is formed of 480 small heating elements arranged in a longitudinal direction on a straight line corresponding to one horizontal line, as shown in the aforementioned U.S. Pat. No. 4,691,211. The heating operation thereof will be explained in detail afterwards. Thermal head 2 is provided with a thermistor 13 to detect the temperature of thermal head 2. This detected signal is provided to microcomputer 8.

A recording paper 5 is wound around a platen roller P. Platen roller P is rotated by a platen roller driving motor M1 so that recording paper 5 is forwarded a distance of circumference corresponding to the width of 1 horizontal line for every printing corresponding to one horizontal line of an image.

An ink sheet containing the aforementioned sublimation dye is wound around a take-up reel **6*a* and a supply reel 6*b* constituting an ink sheet cassette. Ink sheet 7 is formed of three types of ink sheets of yellow, magenta and cyan arranged along the longitudinal direction. Take-up reel 6*a* is rotated by an ink sheet winding motor M2 so that the ink sheet of one of the primary colors, for example yellow, is rolled up by takeup reel 6*a* upon termination of printing one picture of yellow, followed by the ink sheet of the next color, for example, magenta rolled up by take-up reel 6*a* upon termination of printing one picture of magenta, and finally the cyan ink sheet rolled up by take-up reel 6*a*** upon termination of printing of one picture of cyan.

Platen roller driving motor M1 rotates platen roller P so that the print start position on the recording paper (the position corresponding to the first horizontal line) comes to the position corresponding to heating element 3 after each printing of one of the three primary colors. Mechanism driving unit 4 controls the rotation of motors M1 and M2 according to a signal from microcomputer 8 in the above described manner.

In order to control the coloring density of the recording paper according to the tone level of each pixel in the reproduced image in a thermal transfer color video printer of the above described structure, the degree of absorption of sublimation dye of each color included in ink sheet 7 into the recording paper is varied for each pixel, by controlling the heating time period of each heating element forming thermal head 2, i.e. by controlling the duration of pulse applied to each heating element. The printing operation of such a conventional sublimation type thermal transfer printer will be explained hereinafter.

FIG. 2 is a graph showing the relation (coloring characteristic) between the heating (energized) time period of one heating element 3 forming thermal head 2 (the abscissa) and the coloring density in a recording paper that is the thermal transfer medium (the ordinate). Referring to the ordinate of FIG. 2, density $D=0$ indicates the state where incident light upon the recording paper is reflected by 100% ($D=-\log_{10}(100/100)$); density $D=1$ indicates the state where the incident light is reflected by 10% ($D=-\log_{10}(10/100)$); and $D=2$ indicates the state where incident light is reflected by only 1% ($D=-\log_{10}(1/100)$). The recording paper itself is not absolutely white and slightly contains density itself (for example, $D=0.05$). In the following description of the conventional example, density 0.05 to 2.0 is divided into 128 tone levels, whereby density 0.05 of the recording paper itself is defined as the 0th tone step, and density 2 is defined as the 127th tone step.

Referring to heating time period T of the abscissa of FIG. 2, the heating time period required by the thermal head right before the recording paper colors is $T_0$. The heating time periods of the thermal head required for carrying out printing of respective tone levels after coloring are respectively $\Delta T_1$, $\Delta T_2$, $\Delta T_3$, . . . $\Delta T_{126}$ and $\Delta T_{127}$. Although these heating time periods vary according to various factors that will be explained afterwards, $T_0$ is typically approximately 3 m seconds, and heating time period $\Delta T_i$ of each tone level is typically approximately 100 μ seconds to 200 μ seconds.

In the case of actually printing to a recording paper, heating element 3 of thermal head 2 must be heated for the time period of $(T_0+\Delta T_1)$ in printing the coloring density of the first tone step. In this case, thermal head control unit 1 functions to apply a pulse having a duration of $(T_0+\Delta T_1)$ to thermal head 2 to energize heating element 3 during this time period. In the case of printing the coloring density of the second tone step, heating element 3 of thermal head 2 must be heated for the time period of $(T_0+\Delta T_1+\Delta T_2)$. In this case, thermal head control unit 1 functions to apply a pulse having a duration of $(T_0+\Delta T_1+\Delta T_2)$ to thermal head 2 to energize heating element 3 during this time period. Similarly, in the case of printing the coloring density of the i-th tone step, heating element 3 of thermal head 2 must be heated for a time period of $(T_0+\Delta T_1+\Delta T_2+ \ldots +\Delta T_i)$. In this case, thermal head control unit 1 functions to apply a pulse having a duration of $(T_0+\Delta T_1+\Delta T_2+ \ldots +\Delta T_i)$ to thermal head 2 to energize heating element 3 during this time period. Energization of heating element 3 according to the pulse provided from thermal head control unit 1 is carried out by a power supply not shown and a drive circuit provided for each heating element included in thermal head 2.

Thermal head control unit 1 comprises a memory (not shown) storing data for determining the above described various heating time periods of $T_0$, $\Delta T_1$, $\Delta T_2$, . . . , $\Delta T_{127}$. The contents of this memory is shown in FIG. 3. In the above described conventional embodiment, the heating time period of heating element 3, i.e. the duration of heating pulse provided from thermal head control unit 1, is determined by counting the number of clock pulses having a predetermined period. In other words, the duration of a pulse for energization is a time period having a length that is an integer multiple of the clock period. The contents of the memory of FIG. 3 comprises data $L_0$, $\Delta L_1$, $\Delta L_2$, . . . , $\Delta L_{127}$ indicating the number of clock pulses to be counted for determining the heating time period for each tone level. The contents of this memory is referred to as the look up table or the tone table hereinafter. The relation between each data of the tone table and the actual heating time period in printing each tone level is as follows.

Assuming that the predetermined period of the clock pulse is CK, the following relationships are established between $L_0$ and $T_0$ and between $\Delta L_i$ and $\Delta T_i$.

$$T_0 = L_0 \times CK$$

$$\Delta T_i = \Delta L_i \times CK \ (i = 1 \text{ to } 127)$$

Therefore, the heating time period in printing the first tone step is:

$$T_0 + \Delta T_1 = L_0 \times CK + \Delta L_1 \times CK$$

and the heating period in printing the i-th tone step is:

$$T_0 + \Delta T_1 + \ldots + \Delta T_i = L_0 \times CK + \Delta L_1 \times CK + \ldots + \Delta L_i \times CK$$

According to the signal provided from microcomputer 8, thermal head control unit 1 obtains data corresponding to the tone level for each pixel on each horizontal line from the tone table of FIG. 3 to count the clock pulses according to this data, whereby a heating pulse having the required duration is produced and provided to thermal head 2. With the above described operation, printing to a recording paper is achieved with coloring density corresponding to the tone level of the image to be printed out. The contents of the memory of FIG. 3 requires 1 byte as the storage capacity for each tone level. This means that if all the data of the 128 tone steps are to be stored, a storage capacity of 128 bytes is necessary for the entire memory.

In the above described conventional sublimation type thermal transfer color video printer, density of printing varies depending on the change in the environment temperature and rise in temperature of the thermal head itself. FIG. 4 shows the change in coloring characteristic of the recording paper according to change in temperature of the thermal head (temperature drift). Referring to FIG. 4, curve $t_0$ indicates the coloring characteristic curve when the environment temperature (or the temperature of the thermal head) is $t_0$, and curve $t_1$ shows the coloring characteristic curve when the environment temperature (or the temperature of the thermal head) is $t_1$ which is lower than $t_0$. It can be seen from FIG. 4 that difference in environment temperature causes different heating time period $T_0$ required for right before the coloring of the recording paper and heating time period $\Delta T_i$ required for printing each tone level. A longer heating time period is necessary to carry out printing of the same density as the environment temperature is lower.

It has been confirmed experimentally that a change in coloring density which can be visually recognized by the human eye occurs if there is a temperature change of 1° C. or more. The temperature of the thermal head rises approximately by 3° C. to 4° C. for every one picture printing of each color of yellow, magenta and cyan. Correction in heating time period according to the environment temperature is necessary to correct the change in coloring density due to such change in temperature. For this purpose, a conventional sublimation type thermal transfer color video printer has a thermistor 13 provided in thermal head 2, as shown in FIG. 1. The temperature of the thermal head is estimated according to the detected signal provided from thermistor 13 to correct temperature of the heating time period of heating element 3.

More specifically, the relation between data $L_0$, $\Delta L_i$ and heating time period $T_0$, $\Delta T_i$ under the environment temperature of $t_0$ is defined as follows:

$$L_0(t_0) = T_0(t_0)/CK$$

$$\Delta L_i(t_0) = \Delta T_i(t_0)/CK \ (i = 1 \text{ to } 127)$$

The relation under the environment temperature of $t_1$ is as follows:

$$L_0(t_1) = T_0(t_1)/CK$$

$$\Delta L_i(t_1) = \Delta T_i(t_1)/CK$$

Data $L_0$ and $\Delta L_i$ are calculated in advance according to the environment temperature to prepare a tone table for each environment temperature to be stored in a memory (ROM). According to the temperature of the thermal head detected by the thermistor, a tone table of the corresponding environment temperature is selected, whereby data $L_0$ and $L_i$ in that table are transferred to the memory (RAM). By determining the heating time period according to the selected data, printing can be carried out at constant tone levels irrespective of the environment temperature.

It is necessary to switch the tone table for approximately every 1° C. in order to prevent the change in density from being perceived visually by a human eye. Since the environment temperature that the thermal head operates is typically in the range of 5° C. to 70° C., it is necessary to prepare a total of 66 tone tables and store the same in advance in the ROM of thermal head control unit 1. The storage of 66 tone tables requires a ROM having a memory capacity of $128\times66=8448$ bytes since the required storage capacity for one tone table is 128 bytes, as mentioned before. This storage capacity is required for each color of cyan, magenta and yellow to result in a total of $8448\times3=25$, 344 bytes of storage capacity for the three colors. There was a problem that this total storage capacity is too large to implement a thermal head control unit 1 including this memory as a microcomputer of one chip.

Instead of providing the above-described ROM of a large capacity to calculate and store in advance tone tables corresponding to various environment temperatures, a method of obtaining data of a tone table by calculation is considered in accordance with the change in environment temperature during printing. The coloring density characteristic shown in FIG. 4 can be approximated by a predetermined function with environment temperature t as a variable. Therefore, the stored contents of the RAM can be modified by newly calculating the contents of the tone table according to the temperature of the thermal head detected by the thermistor for every 1 cycle of heating, i.e. for every printing of 1 horizontal line. This method has a disadvantage that a microcomputer having a very high operation speed is necessary since some time period is required for the calculation of the tone table every time one horizontal line is printed.

SUMMARY OF THE INVENTION

In view of the foregoing, an object of the present invention is to provide a thermal transfer video printer that can control coloring density at constant tone levels, irrespective of change in environment temperature.

Another object of the present invention is to provide a thermal transfer video printer that can carry out temperature correction of coloring density without a memory of large capacity.

A further object of the present invention is to provide a thermal transfer video printer that can carry out temperature correction of coloring density, without a microcomputer having a very high operation speed.

Briefly, the present invention is a thermal transfer printer for carrying out density reproduction of N tone levels (N is a positive integer) on a coloring medium, including a thermal head, a thermal head control unit, a RAM, a register, a tone controller, a thermistor, and a microcomputer. The thermal head includes heating elements for printing on a coloring medium by heating. The thermal head control unit applies to the heating element i energizing pulses in succession having durations corresponding to respective tones for carrying out printing of a desired i tone level (i is an integer of 1 to n) among the N tone levels. The RAM stores a tone table of N data which is the basis for determining the duration of the energizing pulse of each tone. The tone table includes a variable first data that is the basis for determining the duration of the first energizing pulse required from when the heating element begins to be heated until just before the heating medium colors, and fixed second to Nth data which are the basis for determining the respective durations of the second to Nth energizing pulses following the first energizing pulse. The register holds a variable value which is multiplied by the fixed second to nth data. The tone controller determines the durations of i energizing pulses according to the data in the tone table and the value of the register. The thermistor measures the temperature of the thermal head. The microcomputer modifies the variable first data in the tone table to a corresponding data calculated in advance, and the variable value held in the register to a corresponding value calculated in advance, according to the temperature measured by the thermistor.

The main advantage of the present invention is that the storage capacity required for temperature correction of coloring density can be reduced significantly in comparison with a conventional one, since the data to be rewritten according to temperature change in the thermal head is only a variable first data of a tone table and a variable value of the register.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 5:
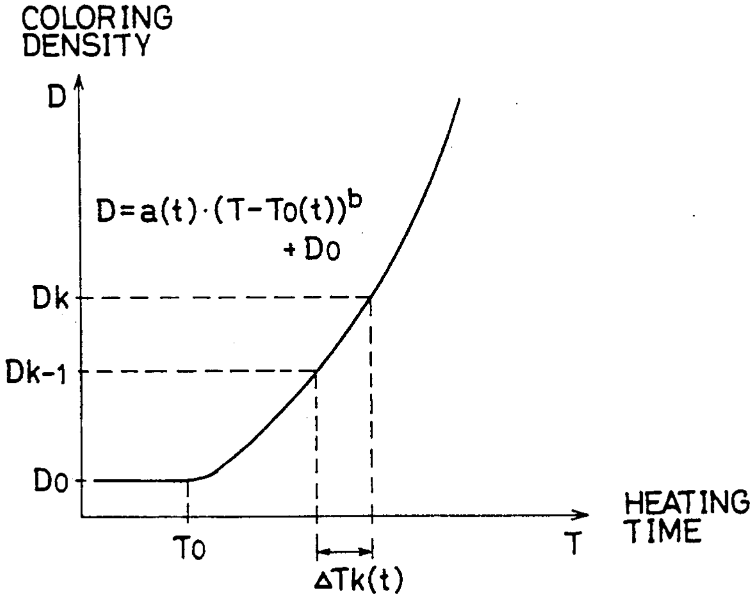
FIG. 5 is a graph showing a general coloring density characteristic of a recording paper.

The principle of the present invention will be explained hereinafter with reference to FIG. 5 showing a typical coloring density characteristic curve.

As shown in FIG. 5, the coloring characteristic of a recording paper serving as a coloring medium is generally approximated by the following equation.

$$D = a(t)\cdot(T - T_0(t))^b + D_0 \quad (1)$$

where

D: coloring density of recording paper a (t): a constant determined by temperature t of thermal head T: heating time period of thermal head $T_0$ (t): heating time period of thermal head required until just before the coloring of recording paper, when the temperature of thermal head is temperature t.

b: a constant depending upon the characteristic of recording paper $D_0$: density of recording paper itself Solving equation (1) with respect to T gives:

$$T = \{(D - D_0)/a(t)\}^{1/b} + T_0(t) \quad (2)$$

Assuming that the k-th tone step density is $D_k$ and the (k−1) th tone step density is $D_{k-1}$, the heating time period $\Delta T_k$ required for changing from the density of the (k−1) th tone step to the k-th tone step is expressed as follows:

$$\Delta T_k = \{(D_k - D_0)/a(t)\}^{1/b} - \{(D_{k-1} - D_0)/a(t)\}^{1/b} \quad (3)$$

If $\Delta T_k$ at reference temperature $t_0$ is $\Delta T_k$ ($t_0$), and $\Delta T_k$ at an arbitrary temperature t other than reference temperature $t_0$ is $\Delta T_k$ (t), $\Delta T_k$ ($t_0$) and $\Delta T_k$ (t) are respectively expressed as follows:

$$\Delta T_k(t_0) = \{(D_k - D_0)/a(t_0)\}^{1/b} - \{(D_{k-1} - D_0)/a(t_0)\}^{1/b} \quad (4)$$

$$\Delta T_k(t) = \{(D_k - D_0)/a(t)\}^{1/b} - \{(D_{k-1} - D_0)/a(t)\}^{1/b} \quad (5)$$

Eliminating $(D_k - D_0)^{1/b}$ and $(D_{k-1} - D_0)^{1/b}$ from the above equations (4) and (5), the following equation is obtained.

$$\Delta T_k(t) = \{a(t)\}^{1/b}\cdot\Delta T_k(t_0) \quad (6)$$

Figure 3:
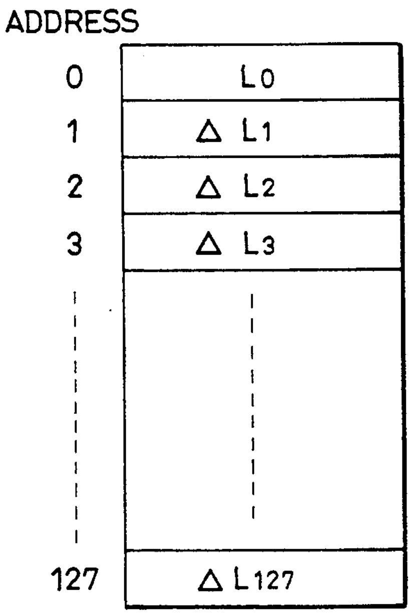
FIG.3 PRIOR ART
FIG. 3 is a tone table of a conventional sublimation type thermal transfer color video printer.
Figure 4:
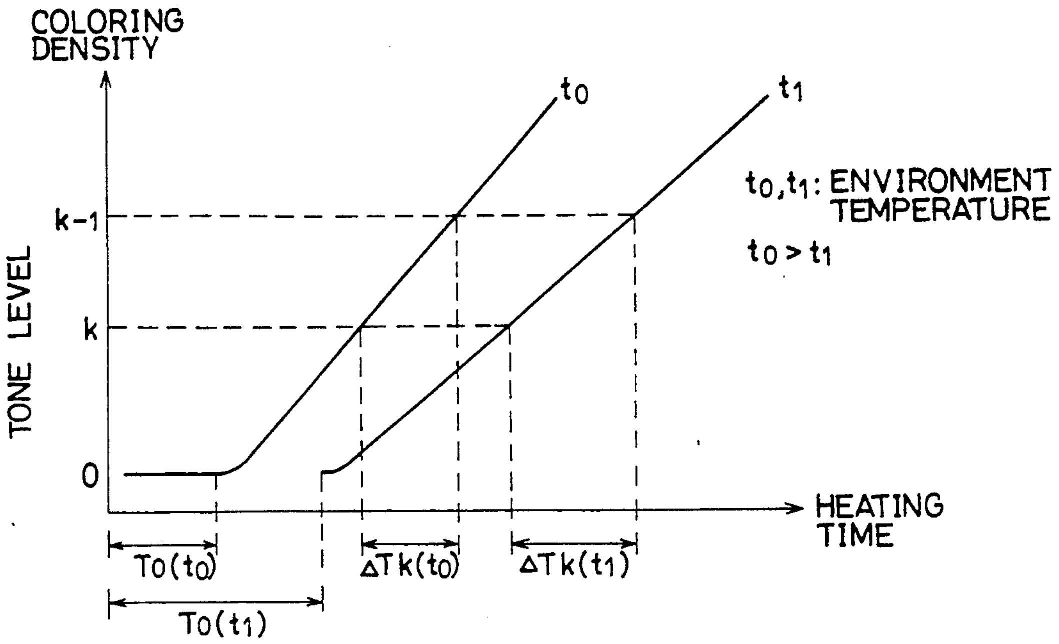
FIG.4 PRIOR ART
FIG. 4 is a graph indicating the temperature drift of coloring density characteristic of a recording paper.

It can be appreciated from equation (6) that heating time period $\Delta T_k$ (t) required for change in density of an arbitrary 1 tone level in arbitrary temperature t can be obtained by multiplying $\Delta T_k$ ($t_0$) at reference temperature t by a constant $A(t) = \{a(t_0)/a(t)\}^{1/b}$ determined by that temperature t.

$$\Delta T_1(t_0), \Delta T_2(t_0), \ldots, \Delta T_{127}(t_0)$$

at reference temperature $t_0$ are first obtained empirically to determine one reference tone table similar to that in the conventional example of FIG. 3 using the relationship of $\Delta L_i = \Delta T_i(t_0)/CK$. This reference tone table is stored in a RAM in advance.

$$A(t) = \{a(t_0)/a(t)\}^{1/b}$$

is obtained for each 1° C. within the temperature range (for example 5° C. to 70° C.) in which printing is carried out. The obtained data is stored in a ROM. According to the actual temperature of the thermal head detected by the thermistor at the time of printing, the corresponding A (t) is read out from the ROM to be multiplied by the data in the reference tone table and by clock period CK to calculated heating time period $\Delta T_i$ (t).

$$A(t)\cdot\Delta L_i\cdot CK = \Delta T_i(t)$$

Then, $T_0$ (t) is obtained for each 1° C. within the temperature range in which printing is carried out, followed by obtaining data $L_0$ (t) using the relation of $L_0(t) = T_0(t)/CK$. The obtained data is stored in the ROM in advance. Next, according to the actual temperature of the thermal head detected by the thermistor at the time of printing, the corresponding $L_0$(t) is read out from the ROM, whereby the data at address 0 in the reference tone table stored in the RAM is updated to this read out data. Heating time period $T_0$ (t) corresponding to the 0th tone step is obtained from $L_0(t)\cdot CK = T_0(t)$.

Regarding the contents of the reference tone table stored in the RAM, data $\Delta L_1$ to $\Delta L_{127}$ at addresses 1 to 127 are constant regardless of environment temperature t, and only data $L_0$ (t) at address 0 is rewritten by the data separately stored in a ROM according to environment temperature t, in the present invention. Constant A (t) dependent of the environment temperature is separately set in a register. According to temperature t of the thermal head detected by the thermistor at the time of printing, $L_0$(t), $\Delta L_1$, $\Delta L_2$, . . . , $\Delta L_i$, and A (t) are read out from these memories to obtain a heating time period having the temperature corrected according to the above described equations.

$$T(t) = T_0(t) + \Delta T_1(t) + \Delta T_2(t) + \ldots + \Delta T_i(t)$$

According to the present invention, the data required to be prepared in separate memories are only two data of $L_0$ (t) and A (t). This reduces drastically the storage capacity required for temperature correction, in comparison with the aforementioned prior art where 66 temperature correction data, for example, are required to be prepared and stored for all the 128 tone levels.

Figure 1:
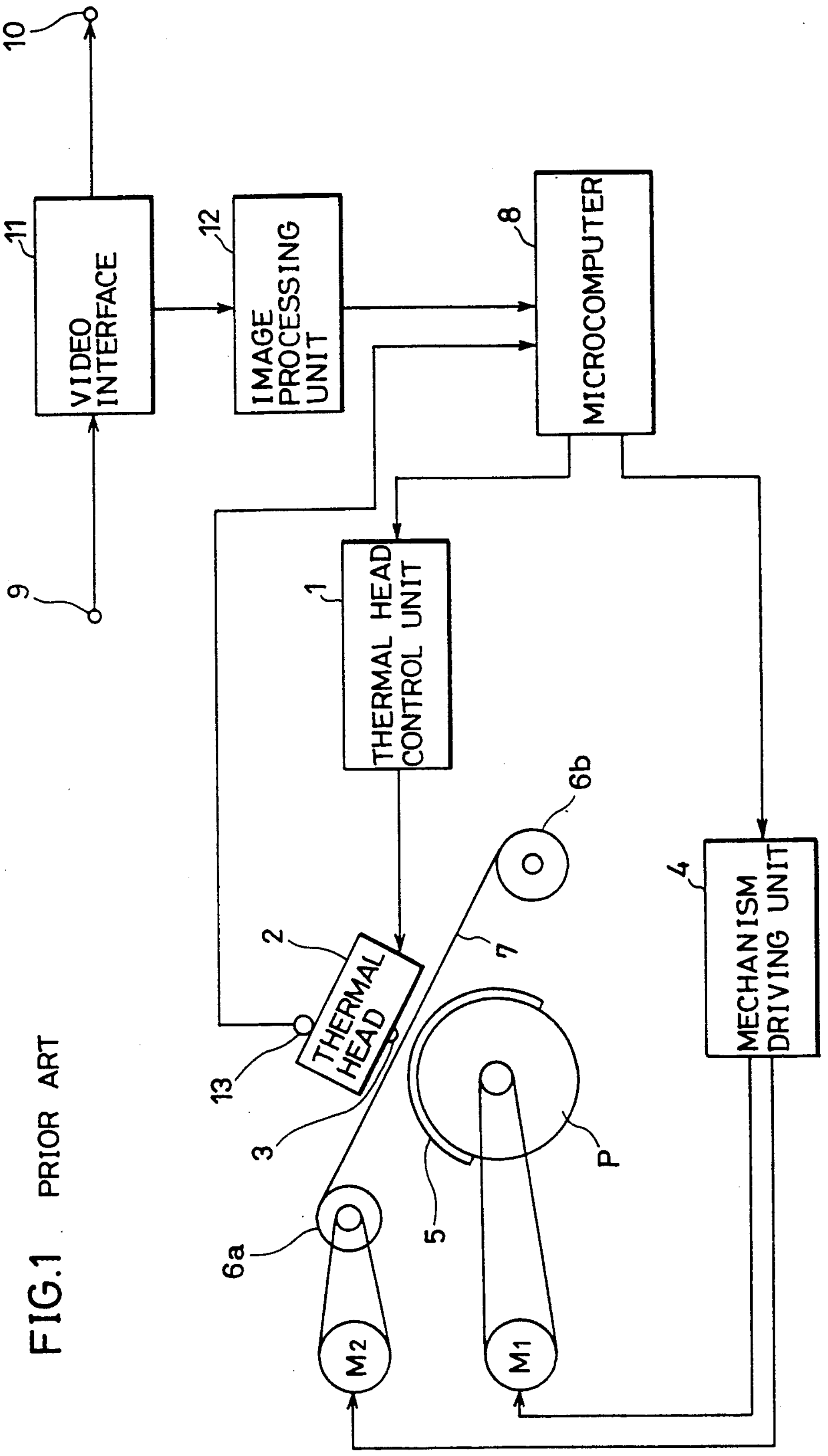
FIG.1 PRIOR ART
FIG. 1 is a block diagram schematically showing a structure of a conventional sublimation type thermal transfer color video printer.
Figure 2:
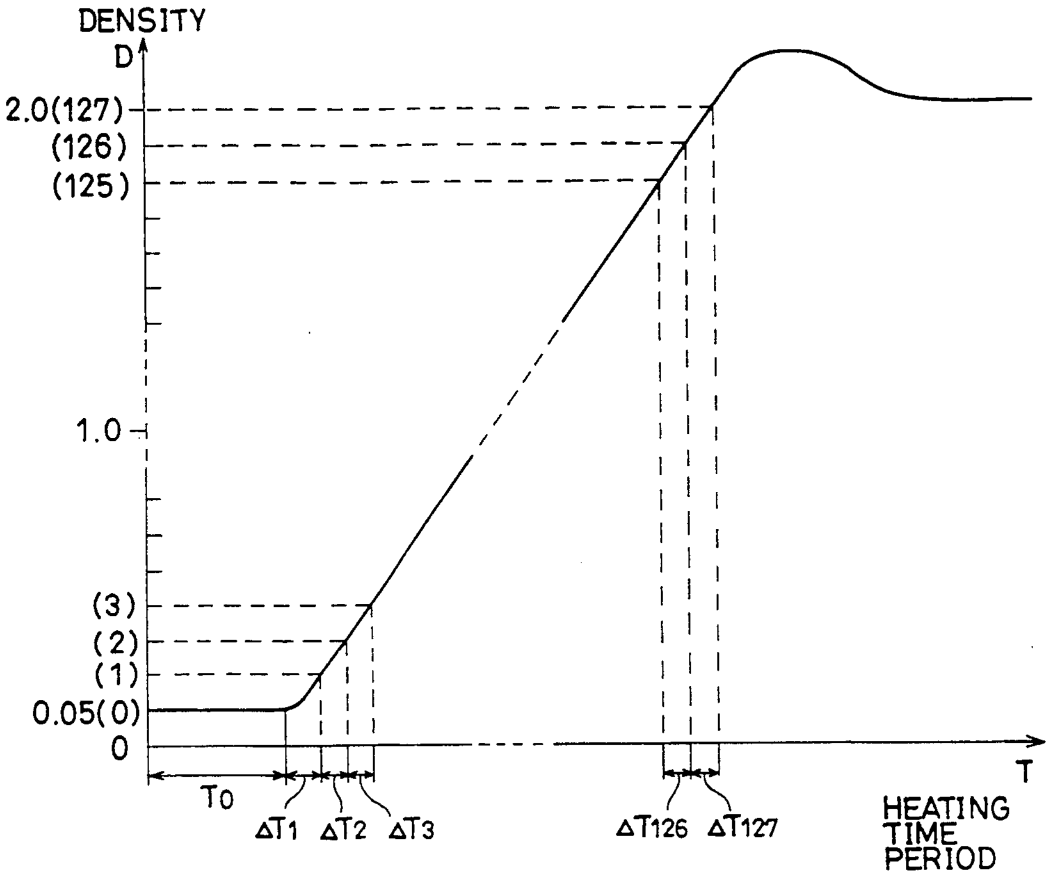
FIG.2 PRIOR ART
FIG. 2 is a graph indicating the coloring density characteristic of a conventional sublimation type thermal transfer color video printer.
Figure 6:
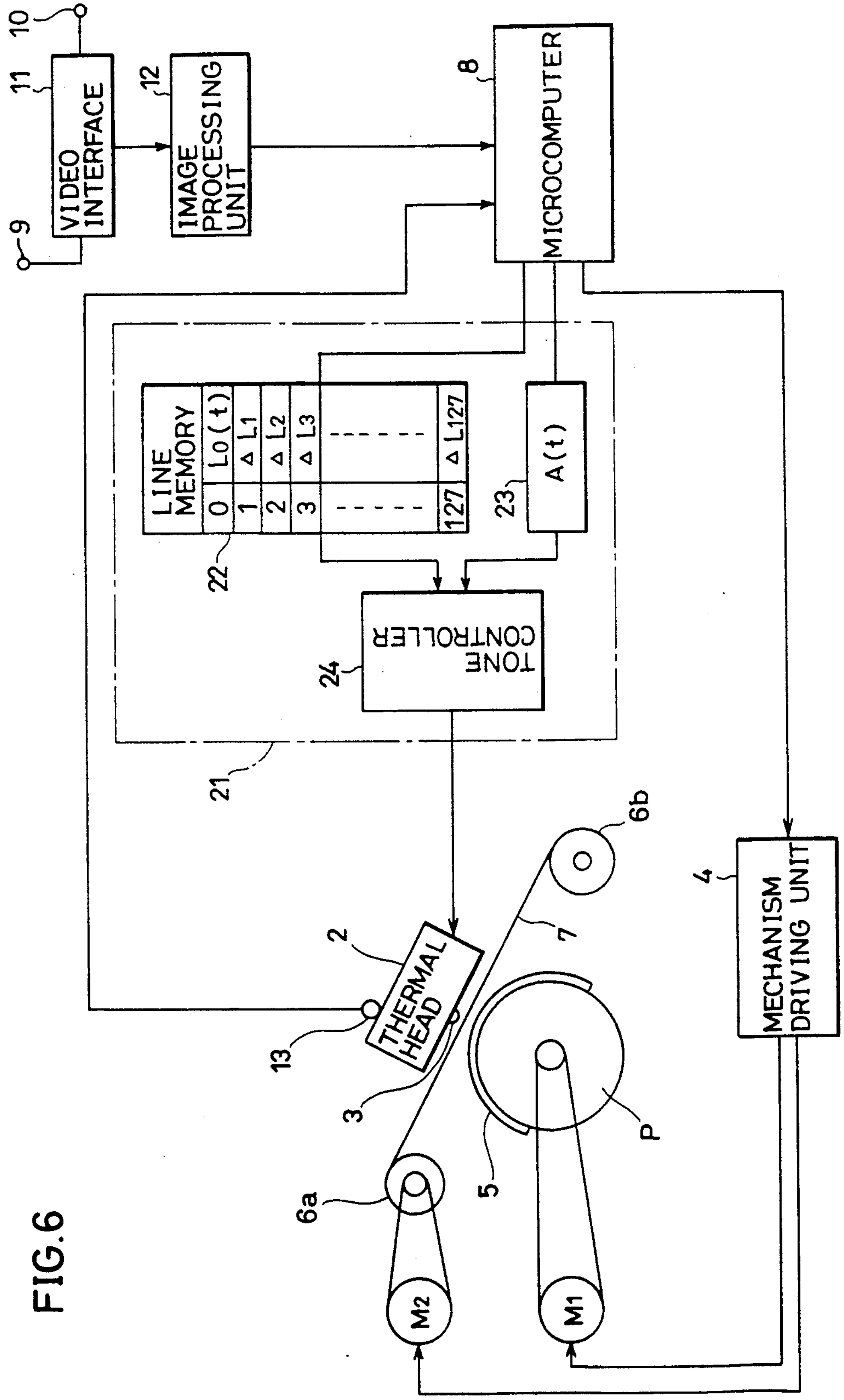
FIG. 6 is a block diagram schematically showing a sublimation type thermal transfer color video printer according to an embodiment of the present invention.

FIG. 6 is a block diagram schematically showing an embodiment of a sublimation type thermal transfer color video printer to which the present invention is applied. The embodiment of FIG. 6 is similar to the conventional thermal transfer printer of FIG. 1 except for the points that will be explained in the following. The description of the common elements will not be repeated.

Referring to FIG. 6, the portion 21 enclosed by a chain dotted line is a block functionally representing the thermal head control unit of the present invention. More specifically, thermal head control unit 21 of FIG. 6 comprises a RAM 22 storing the above described reference tone table and the density information of the one line to be printed. At the addresses 1 to 127 of the reference tone table, the aforementioned fixed data $\Delta L_1$ to $\Delta L_{127}$ are stored. According to temperature t of the thermal head detected by thermistor 13, microcomputer 8 reads out the corresponding data $L_0$ (t) stored in advance in the incorporated ROM (not shown) to store the same at address 0 of the reference tone table. Thermal head control unit 21 comprises a register 23. Microcomputer 8 reads out the corresponding constant $A(t) = \{a(t_0)/a(t)\}^{1/b}$ stored in the above described ROM according to the detected thermal head temperature t to store the same in register 23.

According to data $L_0$(t) at address 0 in the tone table of RAM 22, tone controller 24 of thermal head control unit 21 calculates heating time period $T_0(t) = L_0(t)\cdot CK$ of the 0th tone step for each pixel in each line. According to data $\Delta L_1$, $\Delta L_2$, . . . , $\Delta L_i$ at addresses 1 to i in the tone table, and data A (t) in register 23, tone controller 24 calculates heating time period $\Delta T_i(t)=A(t)\cdot\Delta L_i\cdot CK$ of each tone level for each pixel in each line. According to these heating time periods, the duration $T(t)=T_0(t)=\Delta T_1(t)+\ldots+\Delta T_i(t)$ of the energizing pulse for each pixel of one line is determined for realizing the coloring temperature required for the corresponding pixel.

Figure 7:
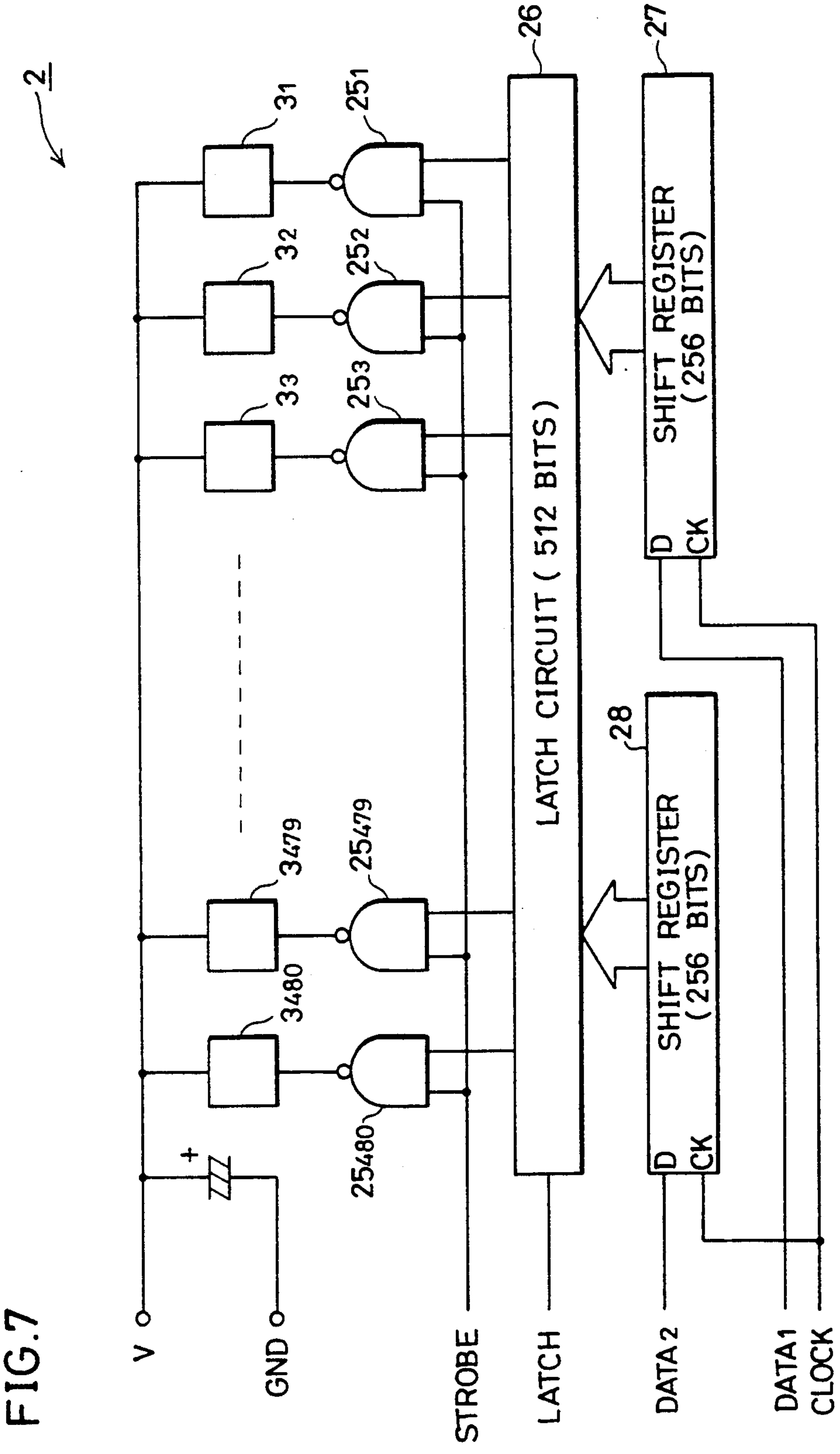
FIG. 7 is an equivalent circuit diagram of a thermal head according to an embodiment of the present invention.
Figure 8:
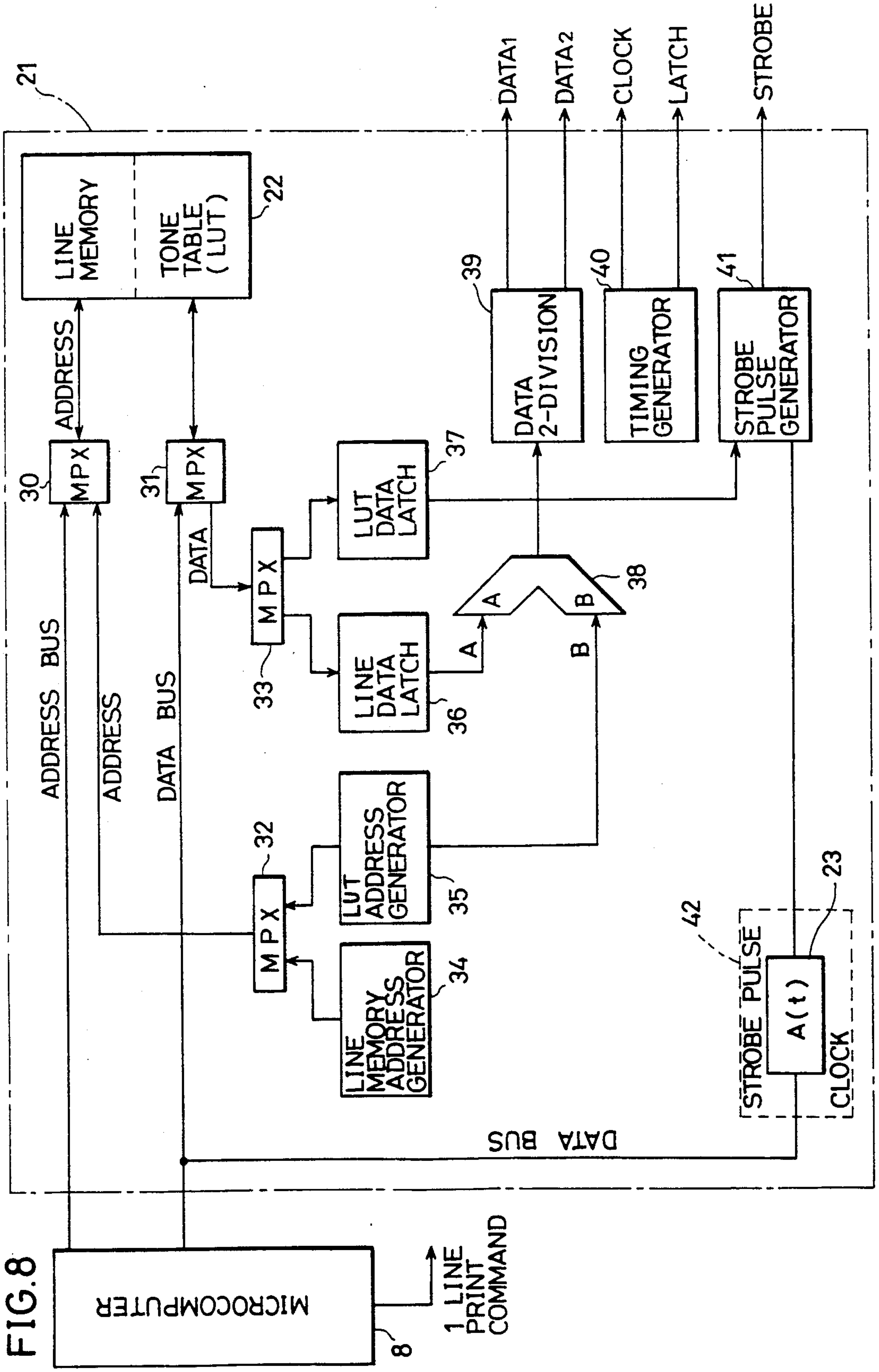
FIG. 8 is a circuit diagram of a thermal head control unit according to an embodiment of the present invention.
Figure 9:
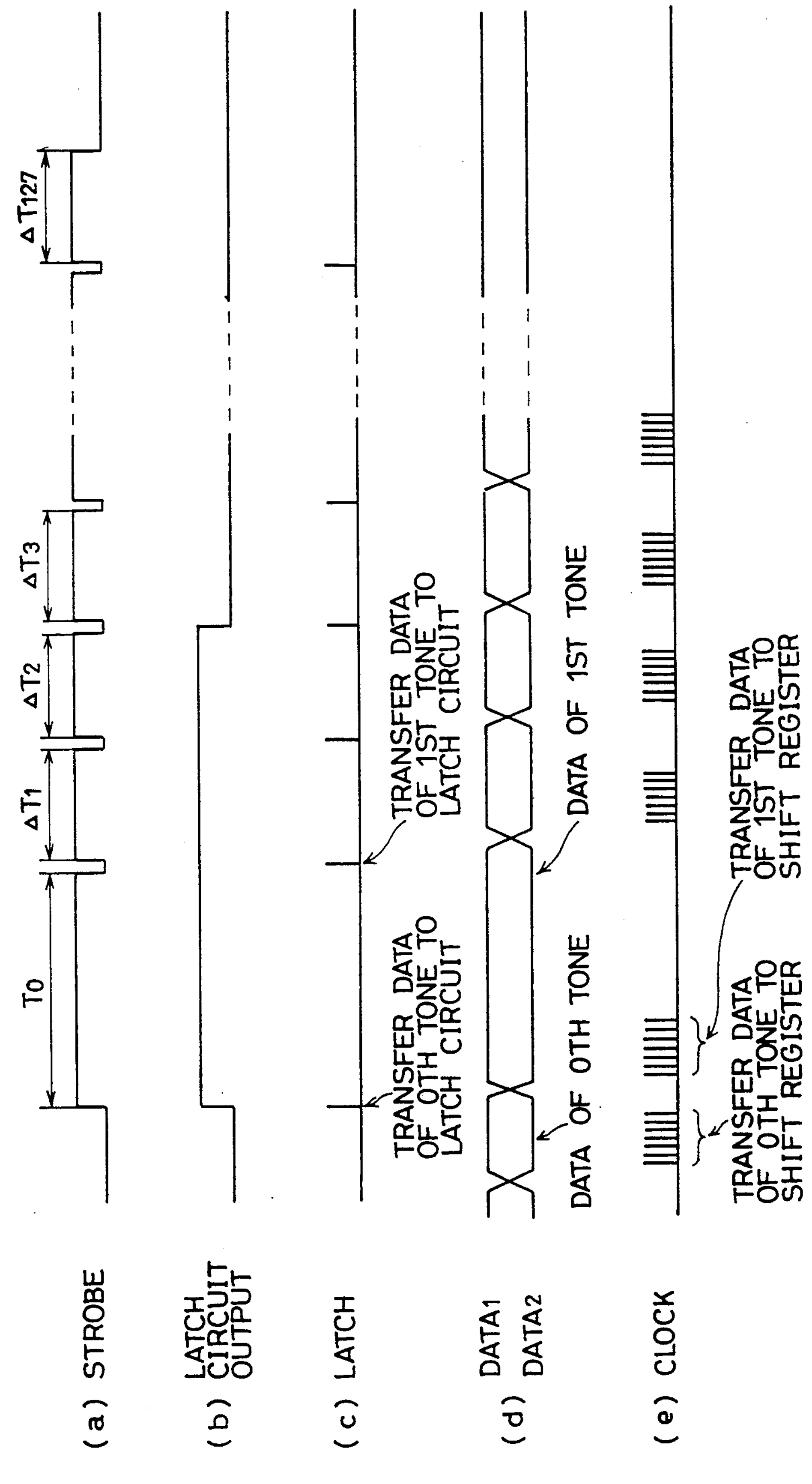
FIG. 9 is a timing chart for explaining the operation of a sublimation type thermal transfer color video printer according to an embodiment of the present invention.

FIG. 7 is an equivalent circuit of thermal head 2 of FIG. 6. FIG. 8 is a block diagram of an example of a circuit configuration implementing thermal head control unit 21 of FIG. 6 in a hardware manner using a digital circuit. FIG. 9 is a timing chart for explaining the operation of controlling the thermal head according to an embodiment of the present invention. The control operation of the thermal head will be explained in more detail with reference to FIGS. 7-9.

Referring to FIG. 7, thermal head 2 comprises 480 heating elements $3_1, 3_2, 3_3, \ldots, 3_{479}$ and $3_{480}$ arranged in parallel so as to correspond to 480 pixels forming one horizontal line. One terminal of each heating element is provided with a predetermined voltage. The other terminals of respective heating elements are connected to the respective drivers of $25_1, 25_2, 25_3, \ldots, 25_{479}$ and $25_{480}$. The output of each driver is determined by a strobe signal applied commonly to one input of each driver and a corresponding data applied to the other input from a latch circuit 26. Latch circuit 26 comprises two sets of dummy bits of 16 bits to result in a latch circuit of a total of 512 bits. The output of 16 bits of each side of the 512-bit latch circuit are not used to drive the heating element, and are provided as dummy bits. Latch circuit 26 latches data 1 held in a shift register 27 of 256 bits and data 2 held in a shift register 28 of 256 bits.

This will be explained in more detail with reference to FIGS. 7 and 9. One input of each driver is supplied with a pulse train (FIG. 9 (*a*)) formed of pulses having durations corresponding to energized times $T_0$, $\Delta T_1$, $\Delta T_2, \ldots, \Delta T_{127}$ for respective tone levels of the heating element from a strobe pulse generator 41 (FIG. 8) that will be explained later. The output of latch circuit 26 (FIG. 9 (*b*)) controls the open/close of the corresponding driver circuit (NAND circuit) so that a number of strobe pulses (FIG. 9 (*a*) corresponding to the coloring density of the corresponding pixel is applied to the corresponding heating element for each pixel.

Referring to FIG. 8, thermal head control unit 21 comprises a RAM 22 formed of a line memory region and a tone table (look-up table: LUT) region. The read and write addresses of RAM 22 are specified by an address signal provided from microcomputer 8 via an address bus and a multiplexer (MPX) 30, or an address signal provided from a line memory address generator 34 or a LUT address generator 35 via MPXs 32 and 30. Data to be written into RAM 22 is provided from microcomputer 8 via a data bus and a MPX 31. Data read out from RAM 22 is provided to a line data latch 36 or a LUT data latch 37 via MPXs 31 and 33.

In the embodiment of the present invention, one horizontal line of the reproduced image is formed of 480 pixels, whereby the density information for each pixel is defined by data of 8 bits. Into the line memory region of RAM 22, density data of 480×8 bits of one line to be printed are provided to be written from microcomputer 8 for each one line printing. A reference tone table as shown in FIG. 6 is stored in the LUT region, to which data $L_0$ (t) corresponding to a new temperature t is provided from microcomputer 8 for every change in temperature of the thermal head 2 to be written into the corresponding address.

Upon termination of writing data of one line into RAM 22, microcomputer 8 generates a command of one line print. This one line print signal triggers thermal head control unit 21 to generate in a hardware manner a heating signal for printing pixels of one line. This signal is provided to thermal head 2.

More specifically, line memory address generator 34 generates an address for sequentially reading out data of 512 bytes of one line from the line memory region of RAM 22. It can be appreciated from FIG. 7 that the read out address of the line memory region is generated in the sequence of 0, 256, 1, 257, . . . , 255, 511, since the input data to latch circuit 26 of thermal head 2 is divided into data 1 via shift register 27 and data 2 via register 28. The density data of one line memory read out from the line memory region in such an order are provided to line data latch 36 via MPXs 31 and 33 to be latched therein.

LUT address generator 35 generates an address for sequentially reading out heating time period data of each tone from the LUT region of RAM 22, as well as functioning as a tone counter for generating a value indicating what step of tone is currently being printed after the initiation of printing. The count value is cleared to 0 at the start of each printing of one line and incremented for each printing of one tone. The heating time period data read out from the LUT region for every printing of each tone is applied and latched in LUT data latch 37 via MPXs 31 and 33.

A comparator 38 compares the density data of each pixel of one horizontal line latched in line data latch 36 with the above-mentioned tone count value generated from LUT address generator 35 to generate an output of 1 (continue printing) when the density data of each pixel is larger or equal to the tone level currently being printed, and otherwise an output of 0 (discontinue printing). This comparison result is provided to a data two-division circuit 39. If the data itself is 0, it is assumed that comparator 38 always generates an output of 0. Data two-division circuit 39 converts the data for each horizontal line from comparator 38 alternately into data 1 and data 2 (FIG. 9(*d*)) corresponding to the two shift registers 27 and 28 in thermal head 2 respectively. The data are applied serially to thermal head 2 of FIG. 7.

Timing generator 40 generates a clock signal (FIG. 9(*e*)) in synchronism with the serial output of data from data two-division circuit 39 to provide the same commonly to shift registers 27 and 28 of thermal head 2. In synchronism with this clock signal, shift registers 27 and 28 capture serially the corresponding data 1 and 2, respectively. Timing generator 40 also generates a latch signal (FIG. 9(*c*)) to control the timing of the latch operation of latch circuit 27 (FIG. 7) of thermal head 2.

A strobe pulse clock generator 42 comprises register 23 having constant A (t) set therein corresponding to temperature t of the thermal head. Strobe pulse clock generator 42 generates a clock signal for counting the length of a strobe pulse provided in common to respective one terminals of drivers $25_1$ to $25_{480}$ of thermal head 2. This clock period is determined by the contents A (t) of register 23, whereby the generated clock signal is applied to a strobe pulse generator 41. Strobe pulse generator 41 generates a strobe pulse (FIG. 9(*a*)) having a duration of heating time period $T_i$ by counting the clock pulses having the period modulated by A (t) provided from strobe pulse clock generator 42 by a number corresponding to heating time period data $\Delta L_i$ latched in LUT data latch 37. The generated strobe pulse is applied to each driver in thermal head 2. According to this strobe pulse (FIG. 9 (*a*)) defining the heating time period and density data (FIG. 9(*b*)) for each pixel held in latch circuit 26 (data of 1 or 0 indicating whether to continue printing or not), each driver generates an energizing pulse having a duration required for realizing coloring density of the corresponding pixel to energize the corresponding heating element during the time period.

This will be explained in more detail with reference to FIGS. 7 and 9. Prior to the generation of the first strobe pulse, data 1 and 2 of the 0th tone step (FIG. 9 (*d*)) are transferred from data two-division circuit 39 to shift registers 27 and 28 in response to a clock signal (FIG. 9 (*e*)). Then, in response to a latch signal (FIG. 9 (*c*)), latch circuit 26 latches the data of shift registers 27 and 28 to drive driver circuits $25_1$ to $25_{127}$ so that heating elements $3_1$ to $3_{127}$ begin to become heated.

During time period $T_0$ when heating of the 0th tone step is carried out, data 1 and 2 of the first tone step are transferred from data two-division circuit 39 to shift registers 27 and 28 in response to a clock signal. Then in response to a latch signal generated at the timing when the heating of the 0th tone step ends, latch circuit 26 latches data in shift registers 27 and 28 to drive each driver circuit so that each heating element is heated during the time period of $\Delta T_1$ corresponding to the first tone step.

Hence, the latch circuit output bit corresponding to the pixel in which printing of the i-th tone step should be carried out is 1. The latch circuit output bit corresponding to the pixel in which printing should be no longer carried out is 0 to terminate the energization of the corresponding heating element. The printing up to the 127th tone step is carried out according to the above described timing.

This causes the required amount of sublimation dye to be sublimated into the recording paper for each pixel of each horizontal line to realize coloring corresponding to the density data.

Hence, according to the embodiment of the present invention, the data to be rewritten according to the change in temperature of the thermal head are only data $L_0$ (t) of address 0 in the tone table, and constant A (t) set in the register that is multiplied by the pulse duration succeeding the first tone step. In the case of calculating the data in the steps of 1° C. to be stored in a ROM, only data of 66 words for each of $L_0$ (t) and A (t) within the range of 5° C. to 70° C. are required to be stored. This allows significant reduction in the storage capacity required for temperature correction in coloring density, in comparison with a conventional one.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A thermal transfer printer for carrying out density reproduction of N (N being a positive integer) toner levels on a coloring medium, comprising:

thermal head means having a heating element for carrying out printing on said coloring medium by heating;

thermal head control means for applying in succession i energizing pulses having durations corresponding to respective tones to said heating element, for printing a desired i-th tone level (i being an integer of 1 to N) among said N tone levels, wherein said thermal head control means includes memory means storing a tone table formed of N data which are bases for determining durations of energizing pulses for respective said tones, wherein said tone table includes a variable first data which is a basis for determining a duration of a first energizing pulse required from when said heating element begins to be heated until just before said coloring medium colors, and fixed second to Nth data which are bases for determining respective durations of second to Nth energizing pulses following said first energizing pulse, wherein said thermal head control means further includes holding means for holding a variable value that is multiplied by said fixed second to Nth data, and means for determining the durations of i energizing pulses according to the data in said tone table and the value of said holding means, measuring means for measuring a temperature of said thermal head, and data modifying means responsive to the temperature measured by said measuring means for modifying the variable first data included in said tone table to a corresponding data calculated in advance, and the variable value held in said holding means to said corresponding value calculated in advance.

2. The thermal transfer printed according to claim 1, further comprising means for providing an image signal representing an image to be printed.

3. The thermal transfer printer according to claim 2, wherein said heating element comprises a plurality of heating elements arranged corresponding to a plurality of pixels forming one horizontal line of said image to be printed.

4. The thermal transfer printer according to claim 3, wherein said thermal head control means further comprises a second memory means for holding an image signal of one horizontal line of said image to be printed.

5. The thermal transfer printer according to claim 4, wherein said duration determining means includes means for determining a tone level for each pixel of said one horizontal line, and means for calculating pulse durations for respective tones corresponding to said fixed data of said tone table, according to a unit of time modulated by said value held in said holding means.

6. The thermal transfer printer according to claim 5, wherein said thermal head means includes means for controlling an energizing time of said heating element for each pixel, according to outputs of said tone level determining means and said duration calculating means.

7. The thermal transfer printer according to claim 1, wherein said thermal transfer printer is a sublimation type thermal transfer color video printer.

* * * * *